United States Patent [19]

Renner et al.

[11] 4,242,947

[45] Jan. 6, 1981

[54] HYDRAULIC ACTUATOR

[75] Inventors: Robert A. Renner; Ralph Lovelace, both of Mankato, Minn.

[73] Assignee: Renner and Lovelace, Inc., Mankato, Minn.

[21] Appl. No.: 929,009

[22] Filed: Jul. 28, 1978

[51] Int. Cl.³ .................. F01B 11/00; F01B 29/08
[52] U.S. Cl. .................................... 92/108; 92/110; 92/137; 92/164; 92/165 R
[58] Field of Search ............... 92/108, 110, 112, 137, 92/164, 165 R; 220/307, 293

[56] References Cited

U.S. PATENT DOCUMENTS

| | | | |
|---|---|---|---|
| 2,148,995 | 2/1939 | Nelson | 220/307 X |
| 2,533,531 | 12/1950 | Stephens | |
| 2,840,347 | 6/1958 | Feucht | 92/137 |
| 3,034,482 | 5/1962 | Rader | |
| 3,136,225 | 6/1964 | Rader | |
| 3,331,292 | 7/1967 | Seablom | 92/108 |
| 3,335,642 | 8/1967 | Rasaen | 92/165 X |
| 3,512,113 | 5/1970 | Kirkendall | 220/307 X |
| 3,598,021 | 8/1971 | Langland et al. | 92/169 |
| 3,617,977 | 11/1971 | Scheiterbauer et al. | 220/307 X |
| 3,650,182 | 3/1972 | Phillips | 92/128 |
| 4,040,342 | 8/1977 | Austin et al. | 220/293 X |
| 4,091,842 | 5/1978 | Greenawalt et al. | 220/307 X |

FOREIGN PATENT DOCUMENTS

| | | | |
|---|---|---|---|
| 1204812 | 9/1970 | United Kingdom | 92/108 |
| 1240370 | 7/1971 | United Kingdom | 92/108 |

*Primary Examiner*—Irwin C. Cohen
*Attorney, Agent, or Firm*—Merchant, Gould, Smith, Edell, Welter & Schmidt

[57] ABSTRACT

A hydraulic actuator, readily assemble and disassemble, which can be used for effecting actuation of food processing machinery or bulk bait or other commodity dispensers. Since it is necessary that such devices be safe and non-polluting, components which come in contact with the hydraulic fluid can be made of plastic so that tap water can be utilized as the hydraulic fluid.

The actuator is made readily assemble and disassemble by including devices for quick and easy sealing and locking of the component parts. These devices have only a minimal number of subcomponents.

15 Claims, 12 Drawing Figures

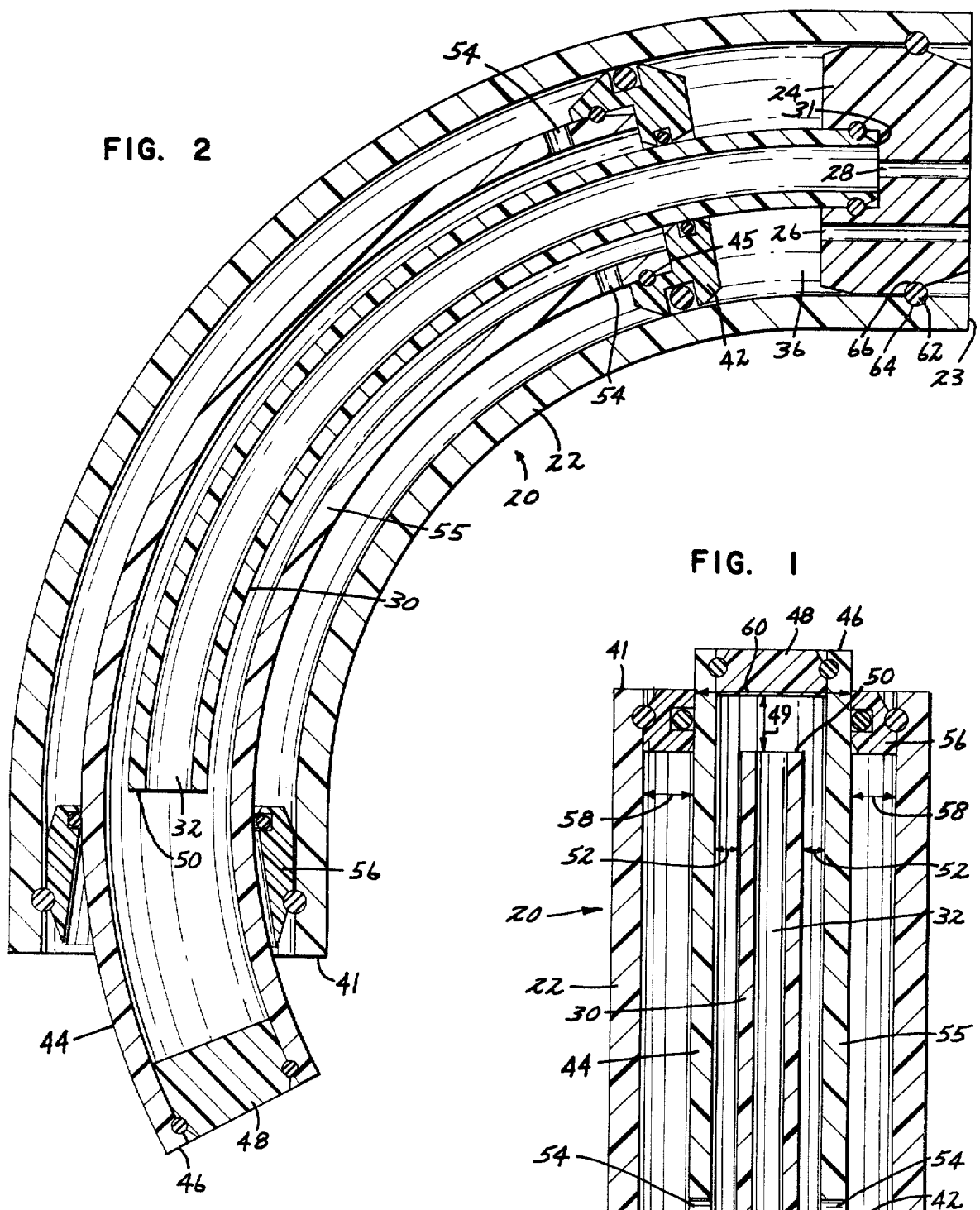

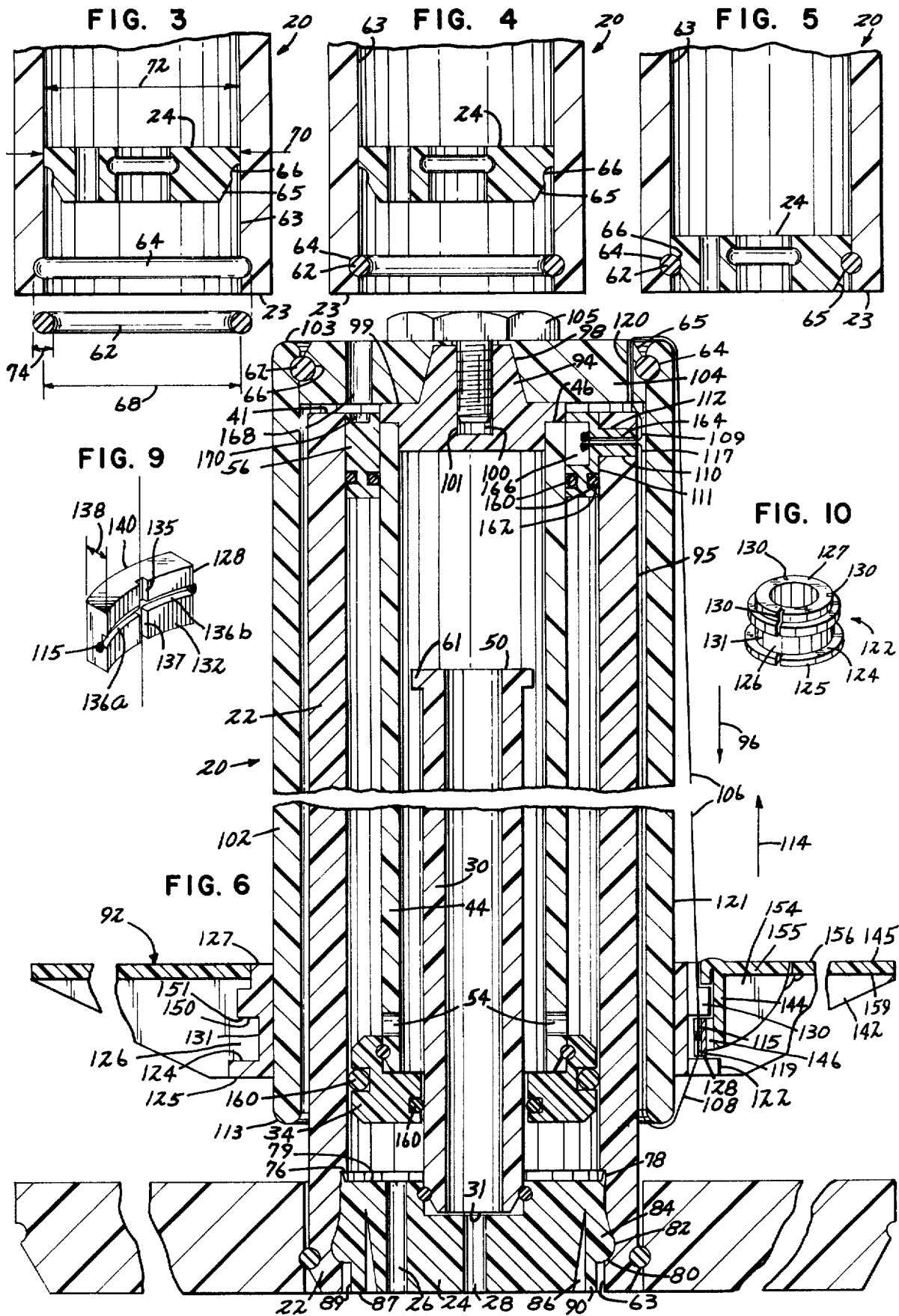

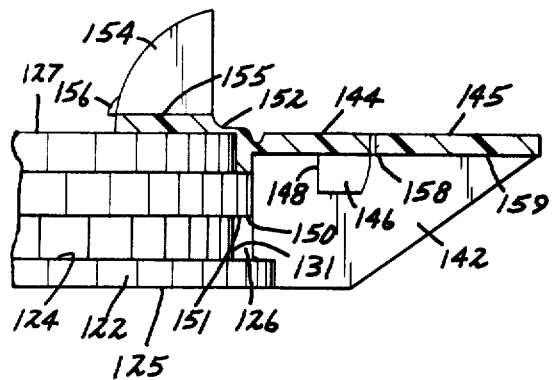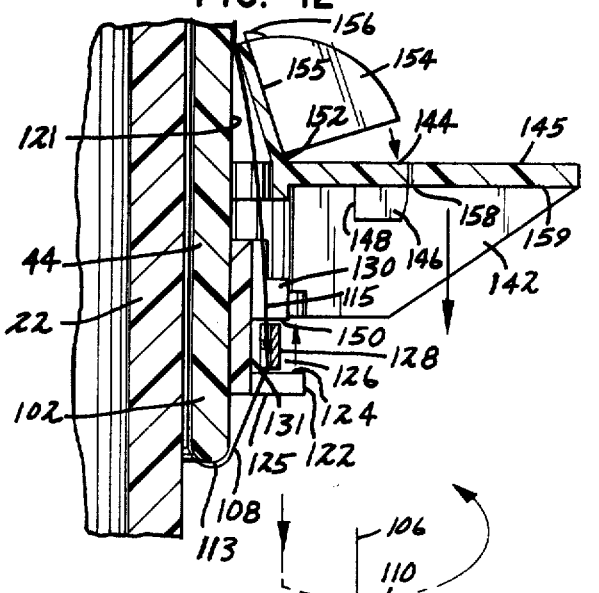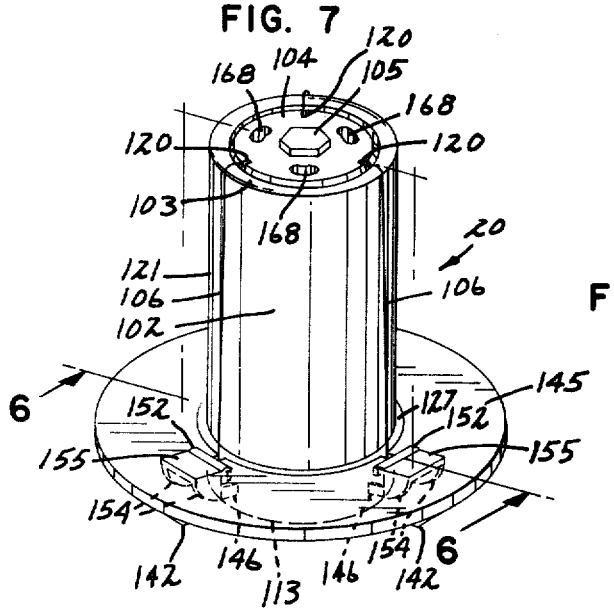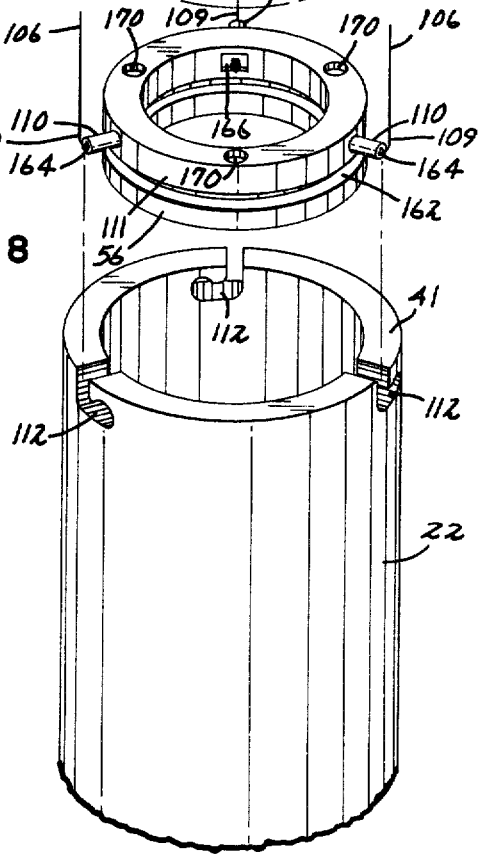

HYDRAULIC ACTUATOR

BACKGROUND OF THE INVENTION

The invention of this application relates to hydraulic mechanisms for actuating the assemblies of which they are components. More specifically, it relates to hydraulic actuators which can be used in food processing machinery or bulk material dispensers.

Hydraulic actuators are basic components in many machines. This is true regardless of the industry.

Because of the nature of certain industries, it is necessary to use hydraulic fluids which are non-polluting. The most common of these non-polluting hydraulic fluids is, of course, tap water. Even tap water, however, contains minerals which may bond to the surface of the components of the actuator and thereby create an unsanitary condition.

Significant sums of money have been invested to develop materials which can be used in the manufacture of hydraulic components compatible with tap water. A number of metallic alloys have been developed which resist corrosion and withstand elevated water pressures. They do not, however, always preclude bonding of minerals within the water to the surfaces of the components.

More importantly though, components made of these materials are inevitably expensive. Frequently, also, they become in short supply with distributors and difficult to obtain.

Additionally, such components frequently comprise an integral assembly, and, therefore, if only a portion of that assembly becomes damaged, the whole assembly must be replaced.

The invention of the present application offers solutions to cure these deficiencies.

SUMMARY OF THE INVENTION

The present invention is a readily assemble and disassemble hydraulic actuator with means for simultaneously adjoining and sealing the various components. It includes an open ended cylinder and a blind end plug closing the cylinder at the first end. The blind end plug has, extending therethrough, extension and retraction fluid transfer ports.

The invention further includes a retract tube mounted at its first end to the blind end plug within the cylinder so that an axial bore which extends through the retract tube's longitudinal length communicates with the retraction fluid transfer port.

The second end of the cylinder is closed by an actuator end plug. This plug has an aperture extending through its axial thickness.

Slidably disposed within the cylinder is a piston. The piston has formed through its axial thickness an aperture to accomodate the retract tube and permit relative movement therewith. The invention provides means for preventing movement of the piston beyond the second end of the retract tube.

An extender tube is mounted at its first end to the piston so that the extender tube encircles, but is radially spaced from, the retract tube. This extender tube extends through the aperture formed in the actuator end plug. Sliding of the piston within the cylinder causes the extender tube to move axially relative to the actuator end plug. The extender tube has a fluid passageway formed through its wall intermediate the piston and the actuator end plug. The second end of the extender tube is closed by an occlusion plug or other means.

In a preferred embodiment shown, the cylinder and blind end plug, the retract tube and blind end plug, the cylinder and actuator end plug, and the piston and extender tube are simultaneously adjoined and sealed. Two devices are disclosed to accomplish this simultaneously adjoining and sealing. This first comprises a female component having a first annular groove formed in its inner surface, a male component having a second annular groove, substantially corresponding in size to the first annular groove, formed in its outer surface, and a resilient O-ring seal received in these annular grooves. The O-ring cooperates with the grooves formed in the male and female components to maintain a fixed axial relationship between those components.

The second device has a female component whose inner surface defines an annular abutment, an annular shoulder, and an annular groove. The annular groove is positioned between the annular abutment and annular shoulder, immediately adjacent the annular shoulder.

The female component cooperates with the male component to effect the simultaneous adjoining and sealing. The male component has an annular deformable lip projecting axially from its second end and an annular deformable bead projecting laterally from its outer surface. The lip and bead are sized and arranged to form a surface conforming to the inner surface of the female component. This conformity allows that the deformable lip will, concurrently, sealably engage the inner surface of the female component and contact the annular abutment, while the bead, disposed within the groove, engages the shoulder.

The male component can have an annular cavity formed radially inwardly from the annular bead which permits radially inward depression of the bead and consequent disengagement of the bead and annular shoulder of the female component.

A preferred embodiment disclosed further comprises an effective work member disposed external to the cylinder for axial movement therewith and a means for transmitting the axial movement of the extender to this effective work member. In the embodiment disclosed, the transmitting means includes a sleeve disposed radially intermediate the cylinder and the effective work member, a means for maintaining a fixed axial relationship between the sleeve and the extender tube, and a cable extending from the cylinder, within the sleeve, to the second end of the sleeve and, thereafter, without the sleeve to the effective work member.

In the embodiment disclosed, the effective work member comprises a sliding bottom support adjacently encircling the sleeve and having an annular floor extending radially outward at its first end. Proximate this floor is an annular groove formed in the circumferential surface of the sliding bottom support. A plurality of axial grooves extend radially outward from the inner diameter of this annular groove and through the axial length of the sliding bottom support. The effective work member further comprises a retaining block and a sliding bottom. The retaining block is disposed within the annular groove of the sliding bottom support and includes means for clasping the ends of segments of the cable means. The sliding bottom is seated on the annular floor of the sliding bottom support. It adjacently encircles the sliding bottom support and thereby securely maintains the retaining block within the annular groove formed in the sliding bottom support.

Finally, the effective work member further comprises a means for locking the sliding bottom support and sliding bottom together in a fixed axial relationship.

As with the embodiment previously described, means for adjoining and sealing the cylinder and blind end plug, the retract tube and blind end plug, the cylinder and actuator end plug, and the piston and extender can be incorporated. This latter preferred embodiment includes a means for adjoining the interface between the cylinder and actuator end plug which comprises a plurality of female bayonent fitting receptacles formed circumferentially within the second end of the cylinder, a plurality of radially extending male bayonent extensions formed in the circumferential surface of the actuator end plug, an annular recess formed in the circumferential surface of the actuator end plug, and a resilient O-ring seal received in this annular recess. The male bayonent extensions are disposed to correspond to the locations of the female bayonent fitting receptacles formed in the cylinder. The actuator end plug is adjoined to the cylinder by insertion and locking of the male bayonent extensions in the female bayonent fitting receptacles.

Innumerable applications of the invention are envisioned. A few specific examples are for actuation in machinery used in the food processing industry and control of bulk vending dispensers. In both of these examples, use of tap water as a hydraulic fluid would be a distinct advantage because of its non-polluting nature. Prior art systems have been offered which may use water as a hydraulic fluid. These systems, however, involve a significant investment of money since their components are made from expensive materials which resist corrosion and withstand elevated water pressures. The invention of the present application is not only easy to make, but is inexpensive also. Many of the components, and particuarly those which are cylindrical, may be readily purchased out of the standard stock of a typical hardware store. Plastic pipe and tubing are frequently standard stock items in hardware stores.

BRIEF DESCRIPTION OF THE DRAWINGS

FIG. 1 is an axial sectional view of a linear hydraulic actuator.

FIG. 2 is an axial sectional view of an arcuate hydraulic actuator.

FIGS. 3-5 are fragmentary sectional views of a portion of FIG. 1 showing various stages of one method of component locking and sealing.

FIG. 6 is an axial sectional view of a second preferred embodiment taken along line 6—6 of FIG. 7.

FIG. 7 is a perspective view of the embodiment shown in FIG. 6.

FIG. 8 is an exploded perspective view showing the cylinder and actuator end plug of FIG. 6.

FIG. 9 is a perspective view of the retaining block.

FIG. 10 is a perspective view of the sliding bottom support.

FIG. 11 is a fragmentary sectional view of the sliding bottom and sliding bottom support in combination.

FIG. 12 is a fragmentary sectional view of the cylinder, sleeve, sliding bottom support, sliding bottom, retaining block, and cable means, in a partially assembled condition.

DESCRIPTION OF THE PREFERRED EMBODIMENT

Referring to the figures, wherein like reference numerals denote like elements, FIG. 1 shows a linear hydraulic actuator 20. A preferred embodiment shown has an open ended cylinder 22 which is closed at its first end 23 by a blind end plug 24. The blind end plug 24 has, passing through its full axial thickness, an extension fluid transfer port 26 and a retraction fluid transfer port 28. Operation of the actuator 20 is controlled by regulating fluid flow through these ports.

A retract tube 30 is mounted at its first end 31 to the blind end plug 24. It is mounted so that it extends from the blind end plug 24 within the cylinder 22. It has an axial bore 32 extending through its longitudinal length. Mounting of the retract tube 30 to the blind end plug 24 is such that this bore 32 communicates with the retraction fluid transfer port 28 formed in the blind end plug 24. In the embodiment shown in FIG. 1, the retract tube 30 is mounted within the retraction fluid transfer port 28. Such a configuration, is not, however, exclusive.

As shown in FIG. 1, the retract tube 30 is mounted concentrically within the cylinder 22. Non-concentric configurations, however, are contemplated by the invention.

A piston is slidably disposed within the space 36 formed between the cylinder 22 and the retract tube 30, the retract tube 30 extending through an aperture 38 formed through the axial thickness 39 of the piston 34. The extension fluid transfer port 26 in the blind end plug 24 communicates with the variable volume space 36 formed between the blind end plug 24 and the first axial face 40 of the piston 34. Introduction of a hydraulic fluid into this space 36 through the extension fluid transfer port 26 causes the piston 34 to be impelled axially toward the second end 41 of the cylinder 22.

Mounted at the second axial face 42 of the piston 34 is an extender tube 44. The extender tube 44 is mounted at its first end 45 to the piston 34, and its second end 46 is closed by an occlusion plug 48. Mounting is accomplished so that the extender tube 44 encircles, and is spaced radially from the retract tube 30. As with the relationship between the cylinder 22 and the retract tube 30, concentricity is not essential between either the cylinder 22 and extender tube 44 or the extender tube 44 and retract tube 30. FIG. 1 does, however, show the extender tube 44 concentrically enclosing the retract tube 30.

The extender tube 44 is of a length, so that, even when the piston 34, to which it is mounted, is in a position fully retracted and adjacent to the blind end plug 24, the occlusion plug 48 will be axially spaced, as shown at 49, from the second end 50 of the retract tube 30. Hydraulic fluid introduced into the axial bore 32 formed in the retract tube 30 through the retraction fluid transfer port 28 will, therefore, freely communicate with the space 52 formed between the retract tube 30 and the extender tube 44.

A fluid passageway 54 is formed through the wall 55 of the extender tube 44 at a point intermediate the second axial face 42 of the piston 34 and an actuator end plug 56 which closes the second end of the cylinder 41. This fluid passageway 54 permits flow of hydraulic fluid from the space 52 between the retract tube 30 and extender tube 44 to the radially outward space 58 formed between the extender tube 44 and the cylinder 22. Such flow permits the exertion of fluid pressure on the full second axial face 42 of the piston 34 when fluid is introduced through the retraction fluid transfer port 28. Since the area of the second axial face 42 of the piston 34 exceeds that of the occlusion plug 48, retraction of the extender tube 44 will thereby be effected.

Optimally, the fluid passageway 54 would be positioned immediately adjacent the second axial face 42 of the piston 34. By being so positioned, the passageway 54 will maintain a free flow of hydraulic fluid between the interior 52 of the extender tube 44 and the space 58 between the cylinder 22 and the extender tube 44 regardless of the relative axial position of the piston 34 to the actuator end plug 56.

In addition to closing the second end of the cylinder 41, the actuator end plug 56 allows relative axial movement of the extender tube 44 therewith through an aperture 60 formed therethrough. Effective work is accomplished by axial extension of the extender tube 44 through this aperture 60 beyond the second end 41 of the cylinder 22.

It is essential to operation of the actuator 20 that the piston 34 not be impelled beyond the second end 50 of the retract tube 30. The invention, therefore, incorporates a means for preventing such axial movement of the piston 34. In the preferred embodiment shown in FIG. 1, the retract tube 30 is of a length so that the piston 34, when advanced axially to a point adjacent to the actuator end plug 56, will not bypass the second end 50 of the retract tube 30. In the embodiment shown, the actuator end plug 56, therefore, functions as the means for preventing axial movement of the piston 34 beyond the second end 50 of the retract tube 30. The retract tube 30 may, however, be made to shorter lengths. In such an embodiment, the preventing means may take the form of an annular bead or nub 61 formed in the circumferential surface of the retract tube 30 proximate its second end 50. Contact of this bead or nub by that portion of the piston 34 slidably contacting the retract tube 30 would prevent further extension. Similarly, an annular bead or nub formed in the circumferential surface of the extender tube 44 would prevent further extension once that bead or nub has contacted the actuator end plug 56.

For effective operation, interfaces between all components must be sealed. Sealing means are, therefore, introduced between elements between which there is relative movement. Such interfaces in the embodiment shown in FIG. 1 are located between the piston 34 and cylinder 22, the piston 34 and retract tube 30, and the extender tube 44 and actuator end plug 56. Similarly, the interfaces of components between which there is no axial movement must also be sealed in addition to being joined together. The invention minimizes the number of elements necessary to comprise this adjoining and sealing means. The devices disclosed to accomplish this simultaneous sealing and locking, facilitate assembly and disassembly of the actuator 20.

FIGS. 3–5 illustrate one method. FIG. 3 shows the first end 23 of the cylinder 22 with the blind end plug 24 inserted to a point axially spaced from the first end 23 of the cylinder 22. A resilient O-ring seal 62 is shown at a point outside of the first end 23. A female component, in this case, the cylinder 22, has an inner surface 63 with a first annular groove 64 formed therein. A male component, in this case, the blind end plug 24, has an outer surface 65 with a second annular groove 66 formed therein. The first and second annular grooves 64 and 66 correspond substantially in size. The mean diameter 68 of the resilient O-ring seal used approximates the outer diameter 70 of the blind end plug 24 and the inner diameter 72 of the cylinder 22. A cross sectional diameter 74 of the O-ring 62 is of a size that the O-ring 62, when cooperating with the annular grooves 64 and 66, fits within these grooves 64 and 66 in a locking fashion, and, thereby, maintains the male and female components in a fixed axial relationship.

FIG. 4 shows the O-ring seal 62 seated in the first annular groove 64 formed in the cylinder 22. As shown in FIG. 5, the blind end plug 24 is then withdrawn until the second annular groove 66 formed therein snaps over, and locks too, and O-ring seal 62.

A second device for accomplishing this simultaneous sealing and locking of a male and female component is illustrated in FIG. 6. The interface used for purposes of illustrating the device is, again, that between the cylinder 22 and the blind end plug 24.

The inner surface 63 of the cylinder 22 defines an annular abutment 76 which axially is engaged by an annular deformable lip 78 projecting axially from the second end 79 of the blind end plug 24. Fluid pressure exerted against the lip 78 causes it to deform radially and to form a seal with the inner surface 63 of the cylinder 22.

The inner surface 63 of the cylinder 22 further defines an annular shoulder 80 and an annular groove 82, the groove positioned between the shoulder 80 and abutment 76 and immediately adjacent the shoulder 80. The blind end plug 24 has an annular deformable bead 84 sized to conform to the annular groove 82 defined by the inner surface 63 of the cylinder 22. Insertion of the blind end plug 24 into the cylinder 22 will cause the bead 84 to deform and pop into the annular groove 82. Axial engagement of the bead 84 with the annular shoulder 80 prevents ready withdrawal of the blind end plug 24. The lip 78 and bead 84 of the plug 24 are arranged so that the bead 84 axially engages the annular shoulder 80 while the lip 78 engages the annular abutment 76.

This sealing and locking device may have formed radially inwardly from the annular bead 84, within the male component, a cavity 86. The cavity 86 would be allowed to intercommunicate with either the first end 87 of the male component or the outer surface 89 of the male component at a point spaced from the bead 84 but between the bead 84 and the first end 87. Existence of such a cavity 86 would permit inward depression of the bead 84 and effect disengagement of the bead 84 and the annular shoulder 80 of the female component. The annular bead 84, could, therefore, be made of a less deformable material.

As shown in FIG. 6, a preferred embodiment incorporates a wedge-shaped annular cavity 86 which intercommunicates with the first end 87 of the blind end plug 24. A release ring 90 is thereby formed which can be depressed to effect disengagement.

The devices disclosed may be used interchangeably at any interface where simultaneous sealing and locking of components must be accomplished. As shown in FIG. 1, these interfaces are located between the cylinder 22 and blind end plug 24, the retract tube 30 and blind end plug 24, the cylinder 22 and actuator end plug 56, and the piston 34 and extender tube 44.

FIG. 2 shows an arcuate embodiment of an actuator 20, otherwise essentially the same as that illustrated in FIG. 1. An alternative configuration of the retraction fluid transfer port 28 is, however, shown. While in FIG. 1, the retraction fluid transfer port has a diameter essentially the same as that of the outer diameter of the retract tube, in FIG. 2, it has a diameter significantly smaller. All simultaneous sealing and locking means illustrated in FIG. 2 are of the type wherein the resilient O-ring seal 62 is received in annular grooves 64 and 66 formed in the male and female components.

FIG. 6 shows a preferred embodiment with a cylinder 22, blind end plug 24, retract tube 30, actuator end plug 56, piston 34, and extender tube 44 of a design and function essentially the same as those of corresponding elements of the embodiment illustrated in FIG. 1. In this embodiment, however, work is performed by an effective work member 92 disposed external to the cylinder 22, intermediate the first and second ends 23 and 41 of the cylinder, for relative axial movement therewith. Axial movement of the extender tube 44 is transferred to this effective work member by transmitting means.

Innumerable means for transmitting the axial movement of the extender tube 44 to the effective work member 92 can be envisioned. The means may take the basic form of an angle bracket, attached to an extender tube cap 94 or other means for closing the second end 46 of the extender tube 44, extending radially beyond the outer surface 95 of the cylinder 22 and, thereafter, in a second axial direction as shown at 96, along that outer surface 95 to the effective work member 92.

In the preferred embodiment shown in FIG. 6, the transmitting means comprises an extender tube cap 94 having a neck 98 extending axially from its second face 99 and an axial bore 100 within the neck 98 threaded on its inner surface 101; a cylindrical sleeve 102 encircling the cylinder 22, its second end 103 extending beyond the second end 41 of the cylinder 22; a means for maintaining a fixed axial relationship between the sleeve 102 and the extender tube 44 which includes, in addition to, the extender tube cap 94, a sleeve plug 104 affixed to the cap 94 by a threaded bolt 105 of a size corresponding to the axial bore 100 formed within the neck 98 of extender tube cap 94, and to the second end 103 of the sleeve 102 by an O-ring 62 locking device; and a cable means having first and second segments 106 and 108. The first end 109 of the first segment 106 is attached at the cylinder 22 and is retained by male bayonet extensions 110, formed in the circumferential surface 111 of the actuator end plug 56, which extend through the cylinder 22 at female bayonet fitting receptacles positioned circumferentially within the second end 41 of the cylinder 22 at points corresponding to the locations of the male bayonet extensions 110. These male bayonet extensions 110 and female bayonet fitting receptacles 112 are best seen in FIG. 8. The first segment 106 of the cable means thereafter extends in a first axial direction within the sleeve, such axial direction indicated by 114, to the second end 103 of the sleeve 102 and, thereafter, in a second axial direction, such direction indicated at 96, without the sleeve 102 to the effective work member 92 at its location proximate of the first end 113 of the sleeve 102. The second end 115 of the segment 106 is attached at the effective work member 92.

The first end 117 of the second segment 108 of the cable means is also attached at the cylinder 22 and retained by the male bayonet extensions 110. This segment 108 extends in a second axial direction within the sleeve 102 to the first end of the sleeve 113 and, thereafter, in a first axial direction without the sleeve 102 to the effective work member 92 where its second end 119 is affixed.

Thus, as can be seen in FIG. 6, the sleeve 102 is positioned radially intermediate the cylinder 22 and the effective work member 92. Since the sleeve 102 is opened at its first end 113, the second segment 108 of the cable means can freely pass about this first end 113 to the effective work member 92. If, as in the preferred embodiment disclosed, a sleeve plug 104 is used as part of the transmission means, axial conduits 120 are formed therein near its periphery to permit passage of the first segment 106 of the cable means. These conduits 120 can be best seen in FIG. 7.

As hydraulic fluid is introduced through the extension fluid transfer port 26, the piston 34 will be impelled toward the second end 41 of the cylinder 22 and will transmit that axial movement to the extender tube 44. The means for maintaing a fixed axial relationship between the extender tube 44 and sleeve 102 will, in turn, transmit that axial movement to the sleeve 102. As the sleeve 102 is moved in an axial direction, that portion of the first segment 106 of the cable means extending without the sleeve 102 will slide over the second end 103 of the sleeve 102 and the effective work member 92 will advance axially along the outer surface 121 of the sleeve 102. As can be seen, movement of the effective work member 92 relative to that of the sleeve 102 will be in a 2:1 ratio. In order for the effective work member 92 to be advanced axially to a point proximate the second end 103 of the sleeve 102, the sleeve 102 must be moved in a first axial direction a distance equal to that portion of the first segment 106 of the cable means which extends without the sleeve 102. This distance is true movement of the sleeve 102. In order to calculate the true movement of the effective work member 92, its movement relative to the sleeve 102 must be considered. in advancing in a first axial direction along the sleeve 102, the relative advance of the effective work member 92 is also a distance equal to that portion of the first segment 106 of the cable means initially disposed without the sleeve 102. To calculate the true movement of the effective work member 92, this relative movement must be added to the true movement of the sleeve 102.

As hydraulic fluid is introduced through the retraction fluid transfer port 28, the piston 34 will be impelled toward the first end 23 of the cylinder 22 and the extender tube 44 will, thereby, retract. Similarly, the sleeve 102 will move in a second axial direction and that portion of the second segment 108 of the cable means without the sleeve 102 will slide over the first end 113 of the sleeve 102. The effective work member 92 will, therefore, move in a second axial direction a distance relative to that traveled by the sleeve 102 in a 2:1 ratio.

When the actuator 20 is oriented in a generally vertical fashion with first ends of components oriented downward, the second segment 108 of the cable means is not essential to effective operation of the actuator 20. With extension of the extender tube 44, the first segment 106 will effect axial movement of the effective work member 92. With retraction of the extender tube 44, gravity will effect second axial direction movement of the effective work member 92. The second segment 108 can, however, be used to insure movement in a second axial direction.

FIGS. 11 and 12 illustrate components which the preferred embodiment of FIG. 6 utilizes for the effective work member. A sliding bottom support 122, shown in FIG. 10, adjacently encircles the sleeve 102. The sliding bottom support 122 has an annular floor 124 formed at its first end 125 and extending radially outward therefrom. An annular groove 126 is formed in the circumferential surface of the sliding bottom support 122 at a point intermediate the first and second ends 125 and 127, of the support. Disposed within this groove 126 is a retaining block 128, shown in FIG. 9. A plurality of axial grooves 130 extend through the axial length of the sliding bottom support 122. The number of grooves 130 corresponds to the number of cables which the cable means is comprised. These axial grooves 130 extend through the sliding bottom support 122 radially outward from the inner diameter 131 of the annular groove 126. The axial grooves 130 permit passage therethrough of the cable means.

The retaining block 128 incorporates means for clasping the second ends 115 and 119 of the first and second segments 106 and 108, of the cable means. In the preferred embodiment, the retaining block 128 has an inner face 132 which abuts the inner diameter 131 of the annular groove 126 formed in the sliding bottom support 122. This inner face 132 has formed therein a cross-pattern recess. The second end 115 of the first segment 106 of the cable means is run through the head 135 of the cross-pattern and, thereafter, through one of the arms 136a. The end 115 of this segment 106 is knotted or enlarged by a welded bead or other means so that when the retaining block 128 is abutted against the inner diameter 131 of the annular groove 126 the segment 106 will be unable to withdraw from the cross-pattern recess. Similarly, the second end 119 of the second segment 108 of the cable means is run through the base 137 of the cross-pattern recess and, thereafter, through the other arm 136b. An enlargement is formed at the end 119 of this segment 108 also so that withdrawal will be precluded.

The retaining block 128 is of a radial thickness 138 so that, when it is positioned in the annular groove 126 of the sliding bottom support 122, its outer face 140 will be flush with the circumferential surface of the sliding bottom support. A sliding bottom 142 is, thereafter, seated on the annular floor 124 of the sliding bottom support 122. The sliding bottom 142 adjacently encircles the bottom sliding support 122, and thereby maintains the retaining block 128 in a position abutting the inner diameter 131 of the annular groove 126.

The effective work member 92 further comprises a means for locking the sliding bottom support 122 and sliding bottom 142 in a fixed axial relationship. FIGS. 11 and 12 show the components of this means made of flexible materials. The sliding bottom 142 has, integrally formed therein, a locking tab 144 pivotally mounted at the upper surface 145 of the sliding bottom 142, adjacent the sliding bottom support 122. This locking tab 144 can be pivoted downward until locking ears 146, proximate the radially outward end of the tab, enter the annular groove 126 formed in the sliding bottom support. When the locking tab 144 is so rotated, the upper surfaces 148 of the ears 146 axially engage an annular shoulder 150 formed by the second end 151 of the annular groove 126.

The sliding bottom 142 also has a locking latch 152 integrally formed therein. The locking latch 152 is pivotally mounted at a point proximate the location of the pivotal mounting point of the locking tab 144. After the locking tab 144 is swung into a locking position, the locking latch 152 is swung into a position whereby ears 146 of the locking tabs 144 are maintained within the annular groove 126 formed in the sliding bottom support 122. This is accomplished by means of a 90° arcuate element 154 attached to the under surface 155 of the locking latch 152. When the locking latch 152 is pivoted downward so it forms a continuation of the upper surface 145 of the sliding bottom 142, this arcuate member 154 abuts the locking tab 144, thereby precluding withdrawal of the ears 146. The outer edge of the locking latch 152 has a deformable nub 156 formed therein for maintaining the locking latch 152 as a continuation of the upper surface 145 of the sliding bottom 142. As the latch 152 is swung down, the nub 156 pops past the upper surface 145 of the sliding bottom 142 and engages a shoulder 158 formed by the underside 159 of the sliding bottom.

The number of locations of these means for locking the sliding bottom 142 and sliding bottom support 122 together may vary. If two are used, they ideally would be positioned at diametrically opposed points on the sliding bottom 142. FIG. 7 shows a use of three, each at a point on the sliding bottom corresponding to the three equi-angularly spaced cable means. When the locking means are so positioned, the ears 146 of each locking tab straddle the retaining block 128 positioned therebetween. The locking means can, however, work equally as well if the locking tabs 144 are circumferentially displaced from the retaining blocks 128.

This embodiment also functions more effectively where interfaces between all components are sealed. Resilient O-ring seals 160 are, therefore, introduced to seal the surfaces between the piston 34 and cylinder 22, the piston 34 and retract tube 30, the extender tube 44 and actuator end plug 56, and the cylinder 22 and actuator end plug 56. This preferred embodiment also comprises means for simultaneously adjoining and sealing the cylinder 22 and blind end plug 24, the retract tube 30 and blind end plug 24, the cylinder 22 and actuator end plug 56, and the piston 34 and extender tube 44. The devices for accomplishing this simultaneous adjoining and sealing are essentially the same as those disclosed in FIG. 1. As previously mentioned, however, adjoining of the cylinder 22 and actuator end plug 56 is accomplished by insertion and locking of male bayonet extensions 110 formed in the circumferential surface 111 of the actuator end plug 56 in female bayonet fitting receptacles 112 formed in the second end of the cylinder 41. Sealing between these components is accomplished by a resilient O-ring seal 160 disposed in an annular groove 162 formed in the actuator end plug 56 at a point axially spaced from the male bayonet extensions 110. This configuration can best be seen in FIG. 8. The first ends 109 and 117, of the first end and second segments 106 and 108 of the cable means are retained by these male bayonet extensions 110 at the cylinder 22. The first ends 109 and 117 of these segments 106 and 108 extend radially inward through bores 164 formed through the male bayonet extensions 110 and can be secured and precluded from withdrawing by knotting the ends 109 and 117 of the segments 106 and 108 or by providing some other enlargement of a size exceeding that of the bores 164. Interference of these enlargements with the interface between the actuator end plug 56 and the extender tube 44 is precluded by recessing them within indentations 166 formed in the inner surface of the actuator end plug 56.

Since the first ends 109 and 117 of the cable means segments 106 and 108 are retained at the cylinder 22 but within these male bayonet extensions 110, the actuator 20 may be disassembled and the cable means withdrawn from the cylinder 22 by releasing the male bayonet extensions 110 from the corresponding female receptacles 112. This may be accomplished by inserting a special tool through tool conduits 168, shown in FIG. 7, into apertures 170 formed in the upper surface of the actuator end plug 56. Slight rotation of the tool will disengage the male fittings 110 from the female receptacles 112. The sleeve plug 104 can be released from the extender tube cap 94 by withdrawing the bolt 105 holding them together. The sleeve plug 104, sleeve 102, actuator end plug 56, cable means 106 and 108, and effective work member 92 can then be removed without requiring disassembly of the other components of the actuator 20.

A foreseen use of the actuator 20 disclosed is in the food processing industry where use of tap water as the hydraulic fluid would be advantageous. Therefore, in the actuator illustrated in FIG. 1, the cylinder 22, blind end plug 24, retract tube 30, actuator end plug 56, piston 34, and extender tube 44 can be made of plastic to retard the bonding of chemicals in the water to those components. Similarly, in the actuator illustrated in FIG. 6, the cylinder 22, blind end plug 24, retract tube 30, actuator end plug 56, piston 34, extender tube 44, sliding bottom 142, sliding bottom support 122, sleeve 104, and sleeve plug 104 can be made of plastic.

Since use of tap water as the hydraulic fluid would render the actuator 20 non-polluting, innumerable other applications of an embodiment in which components are made of plastic can be foreseen. Illustrative examples are coin operated, fresh bait dispensers and, more broadly, bulk vending machines dispensing virtually any bulk commodity. Typical products which might be dispensed are flour, sugar, and coffee. Coin vending would eliminate the necessity of a clerk purchase.

A favorable aspect of the invention is that many of its components can be purchased out of the standard stock carried by most hardware stores. Reference here is made particularly to the cylindrical components utilized.

Another advantage of the invention becomes readily apparent. Since the actuator 20 is readily disassembled and many components can be easily and cheaply purchased, repair for replacement can be effected "on-site". These repairs or replacements can be effected at a minimal expense.

What is claimed is:

1. A hydraulic actuator, comprising:
   an open ended cylinder having first and second ends and a plurality of female bayonet fitting receptacles formed circumferentially within said second end;
   a blind end plug having extension and retraction fluid transfer ports extending through its axial thickness, said blind end plug closing the first end of said cylinder;
   a retract tube having first and second ends and an axial bore through its longitudinal length, mounted at its first end within the cylinder to the blind end plug so that said axial bore communicates with the retraction fluid transfer port of the blind end plug;
   an actuator end plug having an aperture extending through its axial thickness and a plurality of radially extending male bayonet extensions formed in its circumferential surface, said extensions circumferentially disposed to correspond to locations of said female bayonet fitting receptacles formed in said cylinder, said actuator end plug closing the second end of said cylinder by insertion and locking of said male bayonet extensions in said female bayonet fitting receptacles;
   a piston, having first and second axial faces, slidably disposed within said cylinder for axial movement therein, said piston having an aperture extending through its axial thickness to accommodate said retract tube and permit relative movement therewith;
   means for preventing axial movement of said piston toward the second end of said cylinder beyond the second end of said retract tube;
   an extender tube, with first and second ends, mounted at its first end to the second axial face of said piston in encircling relation to, and spaced radially from, the retract tube, its second end extending through the aperture of said actuator end plug, said extender tube disposed for relative axial movement therewith, and said extender tube having a fluid passageway formed through the wall of said extender tube intermediate the second axial face of said piston and said actuator end plug;
   means for closing the second end of said extender tube;
   an effective work member disposed external to said cylinder for axial movement relative thereto;
   a sleeve with first and second ends, said sleeve disposed radially intermediate said cylinder and said effective work member for axial movement relative thereto;
   means for maintaining a fixed axial relationship between said sleeve and said extender tube; and
   cable means having first and second ends, said first ends retained at said male bayonet extensions and said second ends attached to said effective work member, said cable means extending in a first axial direction within said sleeve from said male bayonet extensions to the second end of said sleeve, and, thereafter, in a second axial direction without said sleeve to the point of attachment at said effective work member.

2. The actuator of claim 1 further comprising:
   means for adjoining and sealing the cylinder and blind end plug, the retract tube and blind end plug, and the piston and extender tube; and
   means for sealing the interfaces between the piston and cylinder, the piston and retract tube, the extender tube and actuator end plug, and the cylinder and actuator end plug.

3. The actuator of claim 2 wherein said means for adjoining and sealing the cylinder and blind end plug, the retract tube and blind end plug, and the piston and extender tube comprises:
   a female component having an inner surface, said inner surface having formed therein a first annular groove;
   a male component having an outer surface, said outer surface having formed therein a second annular groove, said second annular groove substantially corresponding in size to said first annular groove; and
   a resilient O-ring seal received in said first and second annular grooves, the mean diameter of the O-ring seal approximating the outer diameter of said male component and the inner diameter of said female component, and the cross-sectional diameter of the O-ring being of a size, when cooperating with said annular grooves, to fixedly maintain the axial relationship of said male and female components in detent fashion, and to seal the interface therebetween.

4. The actuator of claim 2 wherein means for adjoining and sealing the cylinder and blind end plug, the retract tube and blind end plug, and the piston and extender tube comprises:
  a female component having an inner surface defining an annular abutment, an annular shoulder, and an annular groove disposed therebetween, said annular groove positioned immediately adjacent the annular shoulder; and
  a male component having first and second ends, an annular, deformable lip projecting axially from said second end, and an annular deformable bead projecting laterally from said male component, said lip and bead being sized and arranged to form an outer surface conforming to the inner surface of said female component, with said lip sealably engaging the inner surface of said female component while adjoining said annular abutment, and said bead axially engaging said shoulder while disposed within said groove.

5. The actuator of claim 4 wherein said male component has formed radially inwardly from said annular bead, a cavity, said cavity intercommunicating with one of the first end of the male component and the outer surface of said male component at a point intermediate said bead and said first end and spaced from said bead, said cavity permitting radially inward depression of said bead, thereby causing disengagement of the bead and annular shoulder of said female component.

6. The actuator of claim 5 wherein said cavity is annular.

7. The actuator of claim 1 wherein the cylinder, blind end plug, retract tube, actuator end plug, piston, extender tube, effective work member, and sleeve are made of plastic.

8. A hydraulic actuator, comprising:
  an open ended cylinder having first and second ends and a plurality of female bayonet fitting receptacles formed circumferentially within said second end;
  a blind end plug having extension and retraction fluid transfer ports extending through its axial thickness, said blind end plug closing the first end of said cylinder;
  a retract tube having first and second ends and an axial bore through its longitudinal length, mounted at its first end within the cylinder to the blind end plug so that said axial bore communicates with the retraction fluid transfer port of the blind end plug;
  an actuator end plug having an aperture extending through its axial thickness and a plurality of radially extending male bayonent extensions formed in the circumferential surface disposed to correspond to locations of said female bayonet fitting receptacles formed in said cylinder, said actuator end plug closing the second end of said cylinder by insertion and locking of said male bayonet extensions in said female bayonet fitting receptacles;
  a piston having first and second axial faces, slidably disposed within cylinder for axial movement therein, said piston having an aperture extending through its axial thickness to accommodate said retract tube and permit relative movement therewith;
  means for preventing axial movement of said piston toward the second end of said cylinder beyond the second end of said retract tube;
  an extender tube with first and second ends mounted at its first end to the second axial face of said piston in encircling relation to, and spaced radially from, the retract tube, its second end extending through the aperture of said actuator end plug and disposed for relative axial movement therewith, said extender tube having a fluid passageway formed through the wall of said extender tube intermediate the second axial face of said piston and said actuator end plug;
  means for closing the second end of said extender tube;
  a sleeve with first and second ends, said sleeve disposed in encircling relation to said cylinder for relative axial movement therewith;
  means for maintaining a fixed axial relationship between said sleeve and said extender tube;
  an effective work member disposed external to said sleeve for relative axial movement therewith; and
  cable means having first and second segments, said first and second segments each with first and second ends, the first end of said first segment affixed at said male bayonet extensions and the second end of said first segment at said effective work member, said first segment extending in a first axial direction within said sleeve from the point of affixation at said male bayonet extensions to the second end of said sleeve, and, thereafter, in a second axial direction without said sleeve to the point of affixation at said effective work member, and the first end of said second segment affixed at said male bayonet extensions and the second end of said second segment at said effective work member, said second segment extending in a second axial direction within said sleeve from the point of affixation at said male bayonet extensions to the first end of said sleeve, and, thereafter, in a first axial direction without said sleeve to the point of affixation at said effective work member.

9. The actuator of claim 8 wherein said effective work member comprises:
  an annular sliding bottom support, with first and second ends, adjacently encircling said sleeve for relative axial movement therewith, said sliding bottom support having an annular floor extending radially outward at said first end, an annular groove formed in its circumferential surface proximate said floor, and a plurality of axial grooves extending through the axial length of said sliding bottom support and radially outward from the inner diameter of said annular groove, said axial grooves allowing passage therethrough of said cable means;
  a retaining block disposed within said annular groove formed within said sliding bottom support, said retaining block having means for clasping the second ends of said first and second segments of said cable means;
  an annular sliding bottom adjacently encircling said sliding bottom support, said sliding bottom seated on the annular floor of said sliding bottom support thereby securely maintaining said retaining block within the annular groove formed within said sliding bottom support; and
  means for locking the sliding bottom support and sliding bottom in a fixed axial relationship.

10. The actuator of claim 9 wherein the cylinder, blind end plug, retract tube, actuator end plug, piston, extender tube, sliding bottom, sliding bottom support, and sleeve are made of plastic.

11. The actuator of claim 8 or 9 further comprising:
means for adjoining and sealing the cylinder and blind end plug, the retract tube and blind end plug, and the piston and extender tube; and
means for sealing the interfaces between the piston and cylinder, the piston and retract tube, the extender tube and actuator end plug, and the cylinder and actuator end plug.

12. The actuator of claim 11 wherein said adjoining and sealing means comprises:
a female component having an inner surface, said inner surface having formed therein a first annular groove;
a male component having an outer surface, said outer surface having formed therein a second annular groove, said second annular groove substantially corresponding in size to said first annular groove; and
a resilient O-ring seal received in said first and second annular grooves, the mean diameter of the O-ring seal approximating the outer diameter of said male component and the inner diameter of said female component, and the cross sectional diameter of the O-ring being of a size, when cooperating with said annular grooves, to fixedly maintain the axial relationship to said male and female components in detent fashion, and to seal the interface therebetween.

13. The actuator of claim 11 wherein said adjoining and sealing means comprises:
a female component having an inner surface defining an annular abutment, an annular shoulder, and an annular groove disposed therebetween, said annular groove positioned immediately adjacent the annular shoulder; and
a male component having first and second ends, an annular deformable lip projecting axially from said second end, and an annular deformable bead projecting laterally from said male component, said lip and bead being sized and arranged to form an outer surface conforming to the inner surface of said female component, with said lip sealable engaging the inner surface of said female component while adjoining said annular abutment, and said bead axially engaging said shoulder while disposed within said groove.

14. The actuator of claim 13 wherein said male component has formed radially inwardly from said annular bead, a cavity, said cavity intercommunicating with one of the first end of the male component and the outer surface of said male component at a point intermediate said bead and said first end and spaced from said bead, said cavity permitting radially inward depression of said bead, thereby causing disengagement of the bead and annular shoulder of said female component.

15. The actuator of claim 14 wherein said cavity is annular.

* * * * *